H. N. RENNER.
AUTOMATIC HAY STACKER.
APPLICATION FILED JUNE 25, 1909.
943,786.
Patented Dec. 21, 1909.
4 SHEETS—SHEET 2.
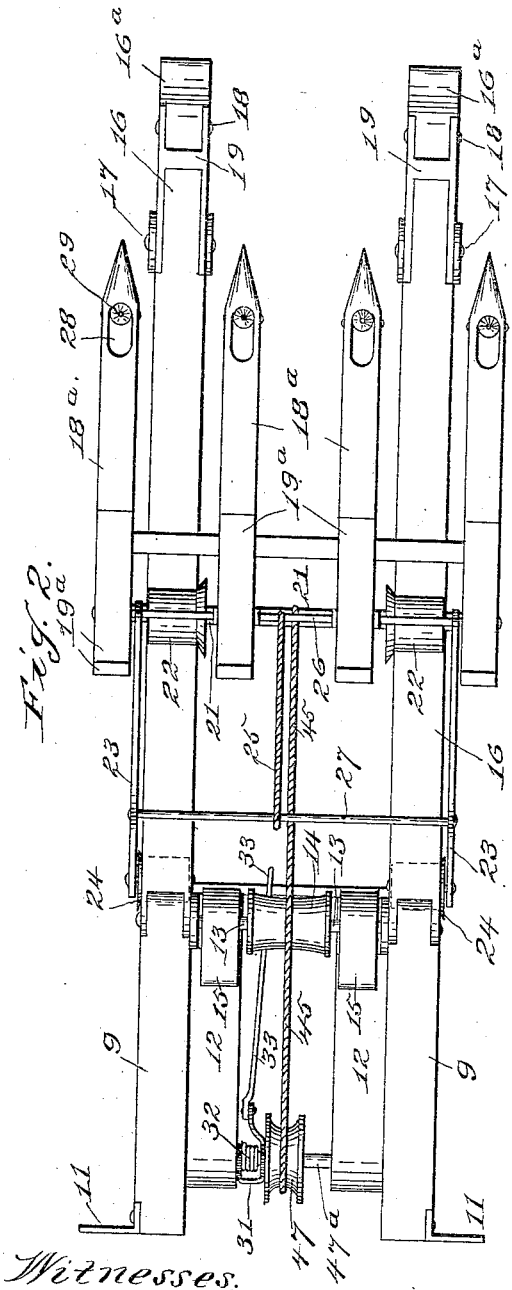
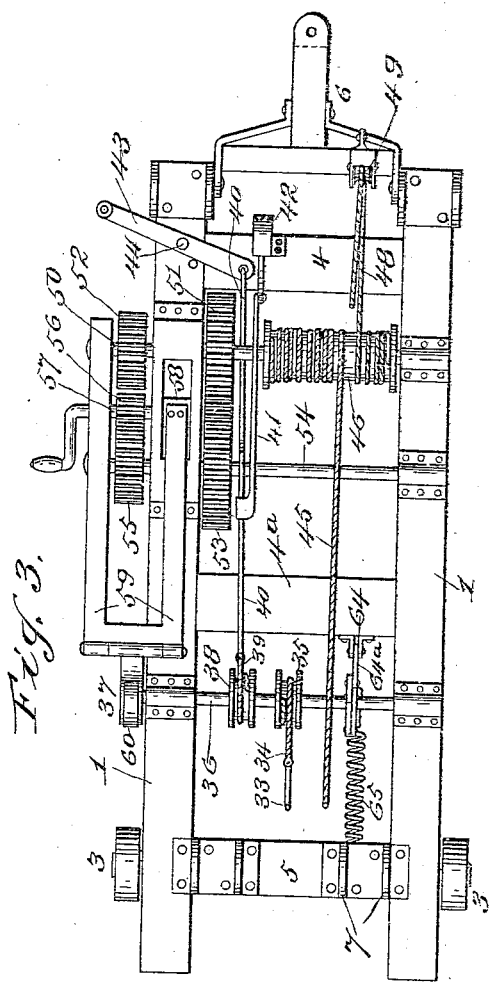
Witnesses.
Wm E. Valk Jr.
C. T. Belt
Inventor
Harry N. Renner
By
Talbert Whitman & Co.
Attorneys.

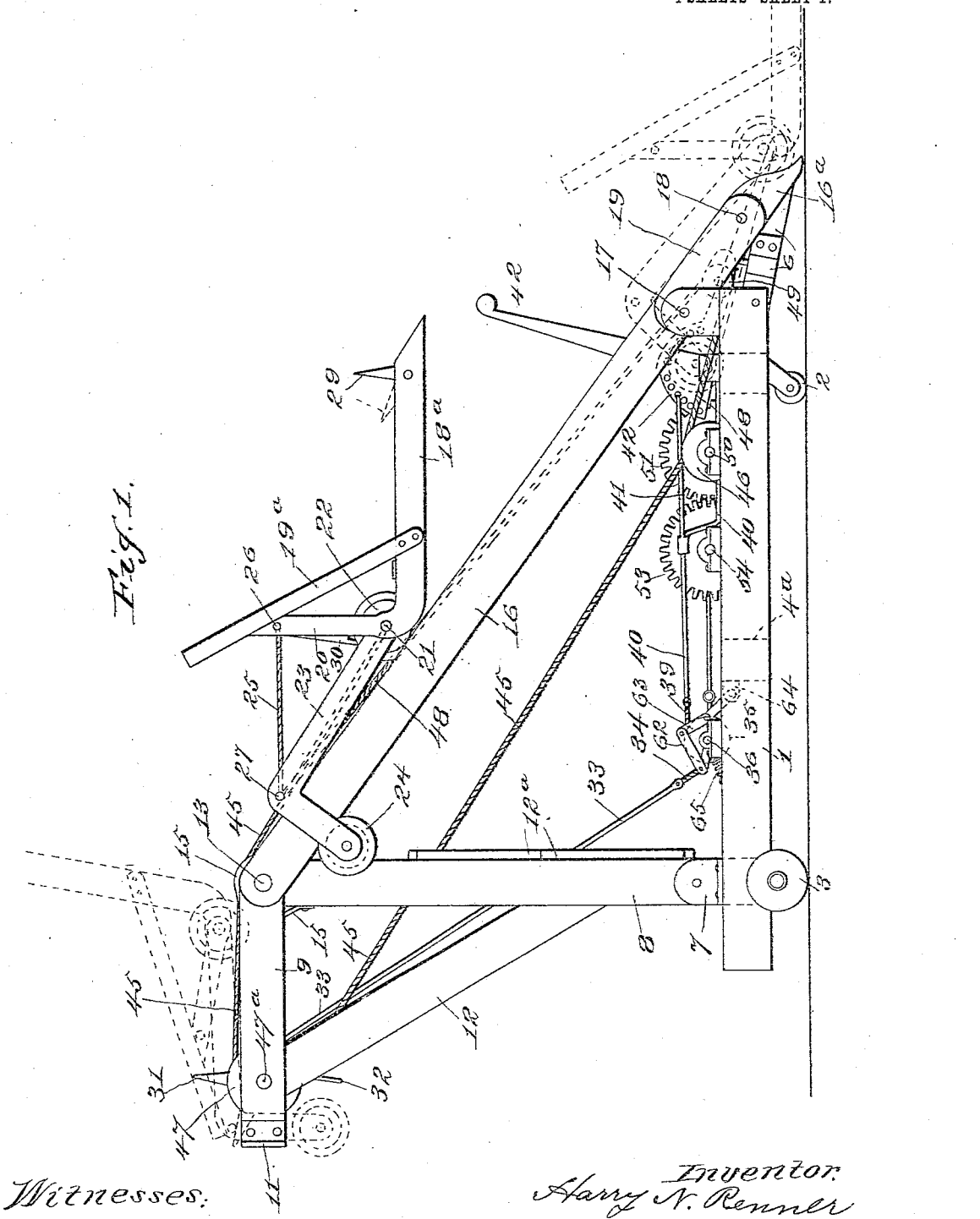

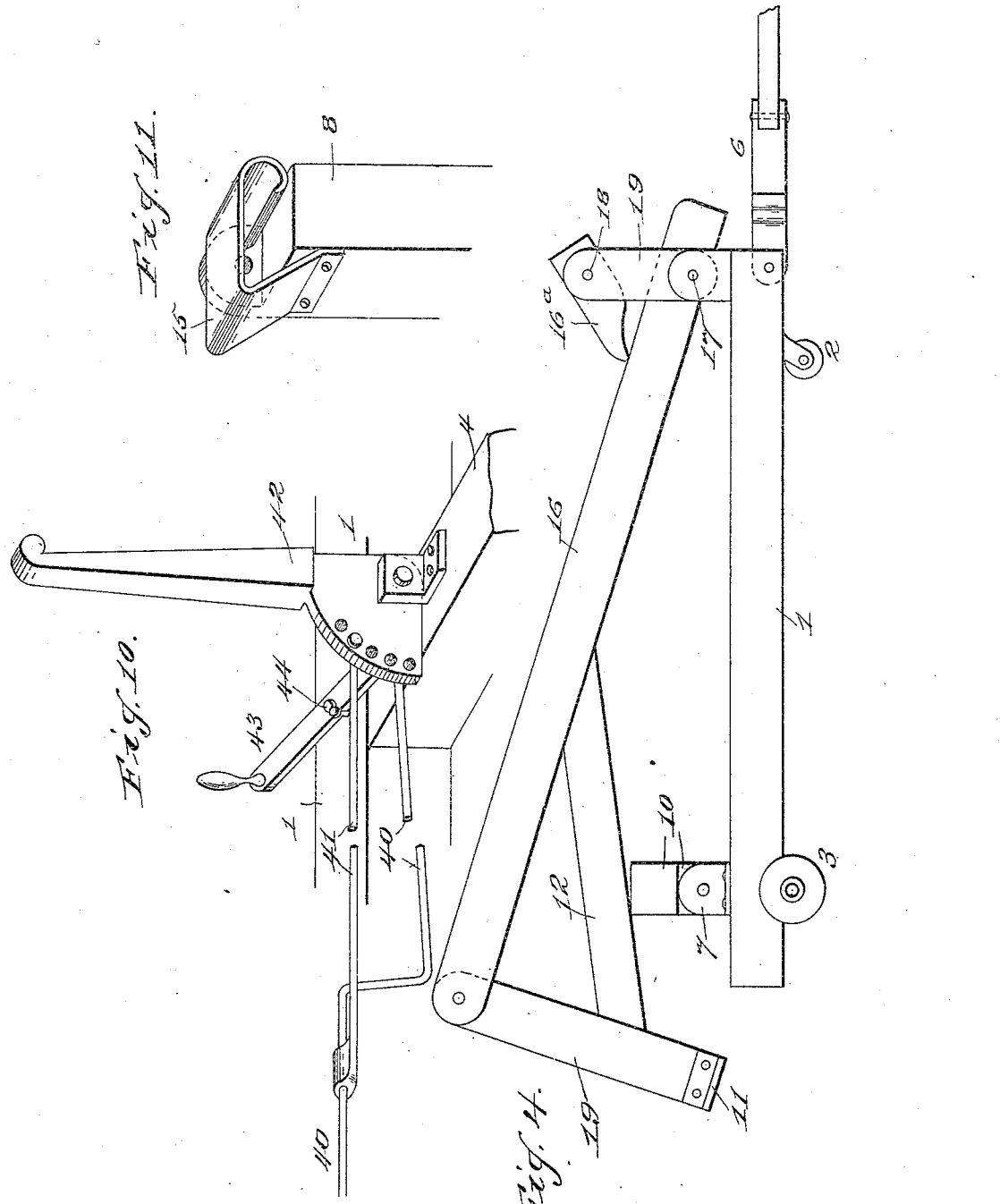

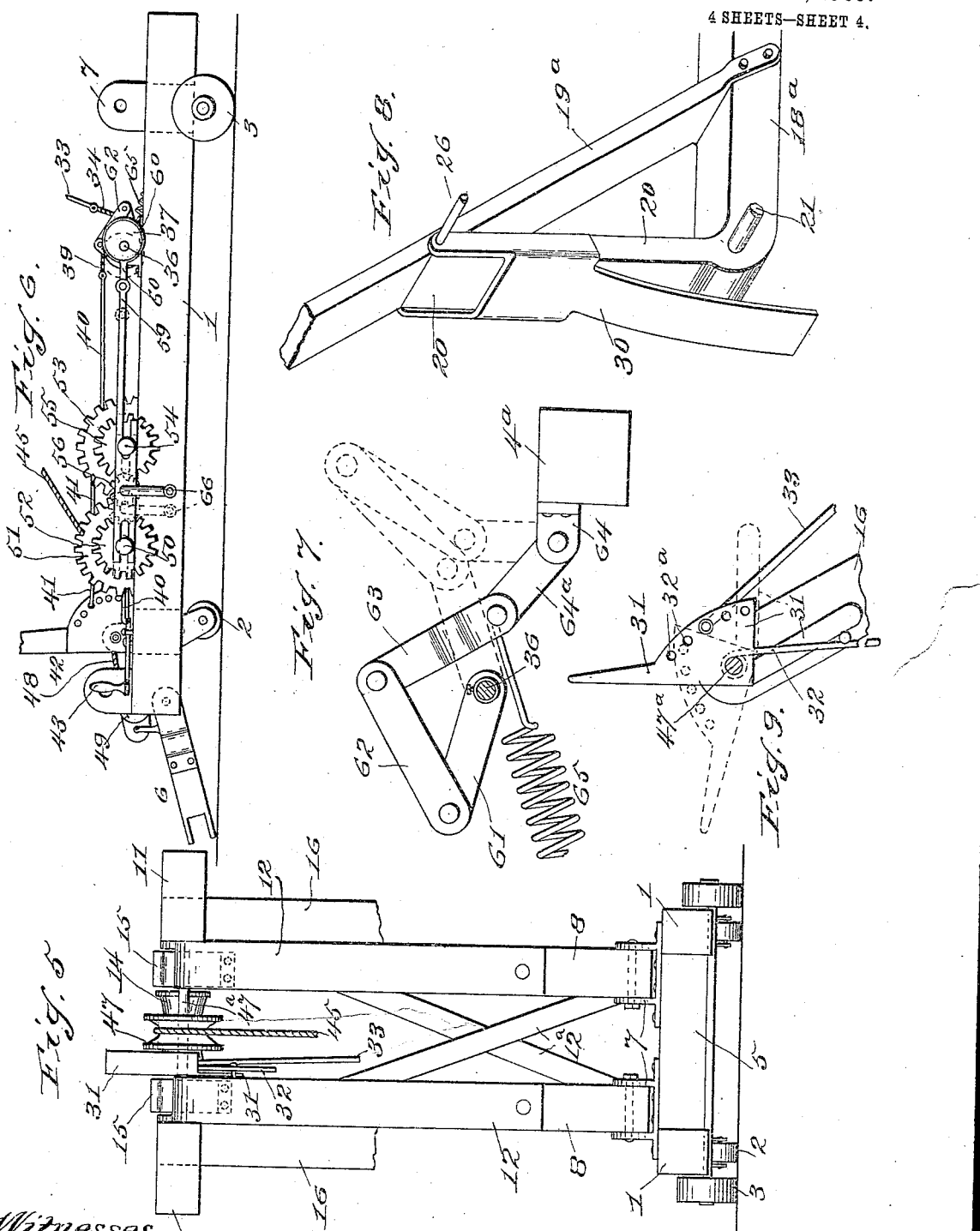

UNITED STATES PATENT OFFICE.

HARRY NATHANIEL RENNER, OF STAR, NEBRASKA.

AUTOMATIC HAY-STACKER.

943,786.  Specification of Letters Patent. Patented Dec. 21, 1909.

Application filed June 25, 1909. Serial No. 504,299.

*To all whom it may concern:*

Be it known that I, HARRY N. RENNER, a citizen of the United States, residing at Star, in the county of Holt and State of Nebraska, have invented certain new and useful Improvements in Automatic Hay-Stackers, of which the following is a specification.

This invention relates to the class of hoisting, and pertains especially to a portable machine for stacking hay.

The object of the invention is to provide a portable machine of novel construction for hoisting or conveying hay from the ground to an elevation for storing or stacking.

A further object of the invention is to provide, in a portable machine for stacking hay, automatic mechanism for operating a traveling or elevating hay fork.

A still further object of the invention is to provide, in a hay stacking machine, certain novel and peculiar trip mechanisms adapted to be operated automatically by a traveling hay fork.

A still further object of the invention is to provide certain mechanism of novel construction and arrangement operated by a traveling hay fork for reversing the hoisting gearing, and for reversing the travel of such fork automatically.

With these and various other objects in view the invention is designed for automatic operation in conveying hay by a fork traveling on an inclined track whence the fork automatically deposits the hay from the top of the track and is automatically returned to the bottom of the track.

In the accompanying drawings forming part of this application: Figure 1 is a side elevation showing the fork part way down the track, the fork being shown in dotted lines at the top and bottom of the track, with the two trip levers depressed by the fork when in dotted line position. Fig. 2 is a top view with the truck mechanism omitted. Fig. 3 is a top view of the truck with its frame and the fork removed. Fig. 4 is a side elevation of the truck and its frame with the latter in folded position for transportation. Fig. 5 is a rear end view of the upright frame. Fig. 6 is a side elevation of what is shown in Fig. 3 partly broken away, the dotted lines showing the movable position of the slide and its pinion. Fig. 7 is a detail elevation of the spring controlled device for the cam-shaft, the dotted lines showing its movable position. Fig. 8 is a detail perspective view of one of the fork prongs having a plate spring. Fig. 9 is a detail elevation of the top trip. Fig. 10 is a detail elevation of the bottom trip showing its lever connections with the fulcrumed handle. Fig. 11 is a detail perspective view of one end of an upright having a spring.

The same reference numerals denote the same parts throughout the several views of the drawings.

The truck comprises side beams 1, having swiveled front wheels 2, and rear wheels 3, a front cross-beam 4, central cross-beam $4^a$, and a rear cross-beam 5, said beam 4 being provided with a tongue-piece 6 adapted to have a tongue-pole attached thereto. The rear cross-beam 5 has a pair of lugs 7 to which are removably secured the uprights 8 of a horizontal track frame 9, and to which lugs 7 a rest 10 is secured in place of the uprights when the parts are folded for transportation.

The outer ends of the frame 9 are provided with stop-flanges 11, and the inner ends of the frame are attached to the top of the uprights 8 and are braced with said uprights by frame pieces 12, and the uprights have cross braces $12^a$. A rod 13 is fixed to and extends across the frame 9, and is provided with a loose drum 14, and the top of each upright 8 is provided with a plate-spring 15, the purpose of which and the drum will be hereinafter described. Track beams 16 have one end pivoted to the inner end of the frame 9 by means of the rod 13, and incline to the front of the truck where they are pivoted at 17 to the side beams 1 of the truck. The end pieces $16^a$ of the track beams 16 are pivoted at 18 in a bracket 19 which swings on the pivot 17, for the purpose of swinging such ends out of the draft line in transporting the machine.

The traveling fork is composed of a series of prongs or fingers $18^a$, from each of which project inclined arms $19^a$, having braces 20 connecting them with the rear end of the said fingers. The fork is pivoted on a shaft 21 having flanged rollers or wheels 22 which ride upon the top of the track beams 16. A fork frame 23 is connected to the fork by the shaft 21, and this frame has guide rollers 24, which travel on the under side of the track beams 16, and on the under side of the frame 9, as the wheels or rollers 22 travel on the top of the frame 9. The pivot movement of the fork is limited by a cord 25 having its ends attached respectively to a brace-rod 26 of the fork and a similar rod 27 of the fork-frame. Each fork prong has a slot 28 in which is pivoted a pointed finger 29 the movement of which is limited by the slots 28. These fingers when in upright position prevent the hay from sliding off the fork, and they fall with the movement of the hay when the fork is tilted in dumping the hay. Pendent plate springs 30 are loosely hung from the rod 26 against two of the fork braces 20, and these springs engage the springs 15, as the fork travels over the joint between the track-beams and the frame 9, so as to cushion the fork and thereby assist the wheels in passing over said joint.

A trip 31 is loosely hung on the rod 47ª, and is held in upright position by a coil-spring 32. This trip stands in the path of the hay fork and is depressed by the rod 27 as the fork travels over the frame 9. The stop-flanges 11 prevent the fork frame from dropping over the frame 9. The trip 31 has a series of holes 32ª for the purpose of adjusting thereto a rod 33, attached to a rope 34 operated on a sheave 35 fixed to an eccentric shaft 36 journaled on the truck and provided with a cam or eccentric 37. A sheave 38 also fixed to said shaft, carries a rope 39, to which is attached one end of a rod 40, having a loosely fitting branch rod 41 adjustably secured to a front trip 42, while the other end of the rod 40 is attached to a hand lever 43 fulcrumed at 44. The said trip 42 is engaged by the fork in its descent to depress this trip.

A cable 45 has one end secured to a windlass 46, and it works over a sheave 47 on the rod 47ª and over the drum 14, and its other end is attached to the fork shaft 21. A cable 48 has one end attached to said windlass and works on a sheave 49 attached to the tongue-piece 6, and its other end is attached to the rod 27. The windlass has a shaft 50 extending from one end thereof, a gear 51, and a gear 52 are fixed to the shaft 50. The gear 51 meshes with a like gear 53 on a shaft 54, having a gear 55. A pinion 56 has its shaft 57 journaled in a box 58 slidable on the ends of the shafts 50 and 54, the box has a hinged connection 59 with an eccentric-strap 60, which fits the eccentric 37 on the end of the shaft 36. This shaft has an arm 61 to which is pivoted a link 62 having one end of a lever 63 pivoted thereto while the other end of the lever 63 is pivoted to a bracket 64 secured to the truck by a link 64ª. A spiral spring 65 has one end connected with the lever 63 and the other end is secured to the truck for controlling the movement of the shaft 36.

The operation of the machine is as follows:—The fork being at its extreme downward movement having a load of hay thereon, the trip 42 is held down by the engagement of the fork therewith, and said trip in assuming such position automatically turns the eccentric shaft connected therewith forward, this operates the shaft levers and expands the spring 65 and slides the pinion forward into mesh with the forward gear for operating the latter and the windlass, the pinion shaft is then turned to run the fork up and in engagement with the trip 31. As the fork passes over the joint springs 15 it tilts over, and when it strikes the trip 31 it forces this trip outwardly, which operates the rod 33 to pull or turn the eccentric shaft 36 backward and operates the shaft levers to slide the pinion into the rear gear where it and the said shaft are held by the spring 65 until the discharge or dumping of the hay is finished, whereupon the hand lever is pulled to release the trip 31 and permit it to assume a vertical position, then the fork is free to be run down by operating the pinion shaft, and in its descent it strikes the trip 42 which has been automatically placed in vertical position by the aforesaid backward movement of the eccentric shaft operating the trip-rod 40. When the trip 42 is engaged by the fork it is moved downwardly by the fork, thus operating the eccentric shaft and its connections to slide the pinion into the forward gear again.

It will be observed that the slight movement of the hand lever to release the trip 31 is not sufficient to overcome the pull of the spring 65 and throw eccentric, therefore the pinion is not slid out of permanent engagement with the rear gear until the trip 42 is depressed by the fork.

While the pinion shaft is provided with a crank handle 66, said shaft may be operated by any suitable motive power connected therewith.

It is obvious that various mechanical changes may be made in the construction and arrangement of the various parts of the machine in practical application, and that the size, shape and material of the machine may be varied as desired without departing from the spirit of my invention as set up in the appended claims.

Having thus described my invention what I claim as new and desire to secure by Letters Patent is:

1. In an automatic hay stacking machine, the combination with a truck, a knock down track frame carried by the truck, and a traveling hay fork, of a trip at one end of the travel of the fork, a trip at the other end thereof, means for propelling the fork, and mechanism connecting said trips for automatic operation by the fork.

2. In a hay stacker having an inclined track for a traveling hay fork, means for propelling the fork, a trip at each end of the track and operated by the fork, a slidable pinion coöperating with the propelling means, and mechanism connecting the trips within the pinion to slide it.

3. In a hay stacker having a frame forming a track, a traveling hay fork operated over the track, means for propelling the fork, a trip at each end of the track and operated by the fork, a slidable pinion coöperating with the propelling means, an eccentric shaft connected with and operated by the trips, and means connecting the shaft with the pinion to slide it.

4. In a hay stacker having a frame forming a track, a traveling hay fork operated over the track, means for propelling the fork, a trip at each end of the track and operated by the fork, a slidable pinion coöperating with the propelling means, an eccentric shaft connected with and operated by the trips, a spiral spring having lever connections with the shaft to limit its movement, and means connecting the shaft with the pinion for sliding it.

5. In a hay stacker having a frame forming a track, a traveling hay fork operated over the track, means for propelling the fork, a trip at each end of the track and operated by the fork, a slidable pinion coöperating with the propelling means, an eccentric shaft connected with and operated by the trips, a spiral spring having lever connections with the shaft to limit its movement, connections from the trip to the shaft, and means connecting the shaft with the pinion to slide it.

6. In a hay stacker having a frame forming a track, a traveling hay fork operated over the track, means for propelling the fork, a trip at each end of the track and operated by the fork, a slidable pinion coöperating with the propelling means, an eccentric shaft operated by the movement of the trips, levers pivoted to the shaft and operated by the latter, a spiral spring connected to the levers to retract them, and means connecting the shaft with the pinion for sliding it.

7. The combination with a traveling hay fork, an elevated track for the fork, and means for propelling the fork, of the trips operated by the forks, and means connecting the trips with the propelling means for reversing the latter.

8. In a hay stacking machine, the combination, with an elevating fork, a fork track, a gear operated windlass for propelling the fork, of a spring controlled eccentric shaft, a trip at each end of the track, means for connecting the trips with the shaft, and mechanism connecting the shaft with the windlass gear for reversing it simultaneously with the operation of the trips.

9. The combination, with a hay stacking frame forming horizontal and inclined tracks, a traveling hay fork, and means for propelling the fork, of pendent springs carried by the fork, and cushion spring at the intersection of said tracks and engaged by the pendent springs during the passage of the forks from one to the other of said tracks.

10. The combination, with an elevating hay fork, inclined and horizontal tracks upon which the fork travels, and means for propelling the fork, of a spring trip at the end of the horizontal track, a trip at the lower end of the inclined track, said trips being operated in one direction by engagement with the fork, and a spring controlled shaft having each trip connected therewith and operated by the movement of the trips.

11. In a hay stacker, the combination, with an elevating hay fork, a windlass connected with the fork, windlass gearing, and a slidable pinion for changing the direction of rotation of the windlass, of an eccentric shaft connected to the pinion for sliding it, a pair of trips operated by the fork, and means connecting the trips with the shaft for operating it.

12. The combination, with a hay fork having wheels for engaging one face of the track, and pendent springs carried by the fork, of a frame to which the fork is pivoted for tilting, and rollers carried by said frame and engaging the opposite face of the track.

In testimony whereof I affix my signature in presence of two witnesses.

HARRY NATHANIEL RENNER.

Witnesses:
 JOHN C. REYNOLDS,
 ARTHUR REYNOLDS.